United States Patent

[11] 3,611,174

[72] Inventor Christopher C. Day
Newtonville, Mass.
[21] Appl. No. 883,411
[22] Filed Dec. 9, 1969
[45] Patented Oct. 5, 1971
[73] Assignee American Optical Corporation
Southbridge, Mass.

[54] ELECTROCARDIOGRAPHIC MONITORING AMPLIFIER
11 Claims, 8 Drawing Figs.

[52] U.S. Cl. .......... 330/85, 128/2.06 B, 328/127, 330/110
[51] Int. Cl. .......... H03f 1/36
[50] Field of Search .......... 330/11, 25, 85, 97, 110; 328/127, 128; 307/230; 128/2.06

[56] References Cited

UNITED STATES PATENTS

| | | | |
|---|---|---|---|
| 3,360,734 | 12/1967 | Kimball .......... | 330/97 X |
| 3,378,781 | 4/1968 | Hill .......... | 330/85 X |
| 3,518,504 | 6/1970 | Games et al. .......... | 330/110 X |

*Primary Examiner*—Roy Lake
*Assistant Examiner*—James B. Mullins
*Attorney*—Amster & Rothstein

ABSTRACT: An electrocardiographic monitoring amplifier. A forward path DC-coupled amplifier is provided between the input and output terminals, and a negative feedback circuit is provided to null the effect of any input offset. The feedback circuit includes an integrator whose time constant is large enough to permit the transmission to the output of low frequency components in the ECG. signal. However, if the output signal goes off scale, the time constant of the integrator is lowered to permit rapid base line stabilization. The forward path amplifier is slew-rate limited to prevent charging of the capacitor in the integrator from spikes appearing at the input terminal.

INVENTOR.
CHRISTOPHER C. DAY
BY Amster & Rothstein
ATTORNEYS

ELECTROCARDIOGRAPHIC MONITORING AMPLIFIER

This invention relates to amplifiers, and more particularly to amplifiers suitable for use in electrocardiographic monitoring systems.

The various stages of an electrocardiographic amplifier are usually DC amplifiers because the ECG signal contains low frequencies which are of interest (typically, the band-pass of the overall amplifier is 0.05–50 Hz.). However, AC coupling is provided between the stages rather than DC coupling in order to remove any DC components due to offsets in the input signal.

This AC coupling requires the use of a capacitor. Because of the incorporation of such a capacitor in an electrocardiographic amplifier, it is often found that the ECG display goes off scale following large pulses or spikes which appear in the ECG signal. For example, a patient being monitored might be equipped with an implanted pacemaker; the pacemaker-stimulating pulses result in the charging of the capacitor, which in turn causes the ECG display to go off scale. Various schemes have been proposed for minimizing this deleterious effect of the capacitor in prior art electrocardiographic amplifiers.

It is an object of my invention to provide an electrocardiographic amplifier which is capable of amplifying signals of very low frequencies and whose output does not go off scale in the presence of input spikes.

In accordance with the principles of my invention, the various amplifying stages in the forward path of the overall amplifier are DC coupled to each other. A voltage proportional to the average output level is fed back to the input where it is subtracted from the ECG input signal. The effect of this arrangement is to null any input offset prior to amplification of the input signal by the first stage of the amplifier.

The feedback path includes an integrator for deriving a feedback signal which is proportional to the average output signal, that is, the DC level of the output. The integrator includes a capacitor. Although the capacitor is in the feedback loop rather than in the forward path of the amplifier, it would still be possible, as it has been in the prior art, for the capacitor to charge as a result of a spike in the input and to thereby cause the output to go off scale. For this reason, I provide a slew-rate limited stage in the forward path of the amplifier to prevent a rapid rise at the output of the amplifier. Because the input of the integrator feedback path is connected to the output of the overall amplifier, which is slew-rate limited, sharply rising spikes are not extended to the capacitor to charge it sufficiently to cause the amplifier output to go off scale.

Because of the inclusion of an integrator in the system, the output of the overall amplifier may take too long to stabilize following a change in the DC level of the input (e.g., following switching of electrode leads). For this reason, I also provide a nonlinear resistance as part of the integrator in the feedback path for lowering the time constant of the integrator if the output voltage goes too high in either direction. Lowering the integrator time constant allows the amplifier to stabilize faster and the output voltage to return to the desired (near zero) quiescent level.

It is a feature of my invention to provide an integrator in a feedback path of a DC-coupled amplifier for nulling the effect of an input offset.

It is a further feature of my invention to include a slew-rate limited stage in the forward path of the amplifier for preventing input spikes from causing the output of the amplifier to go off scale.

It is a still further feature of my invention to include a nonlinear resistance in the integrator for controlling rapid stabilization if the output voltage goes too high in either direction. Further objects, features and advantages of my invention will become apparent upon consideration of the following detailed description in conjunction with the drawing in which.

Figure 1:
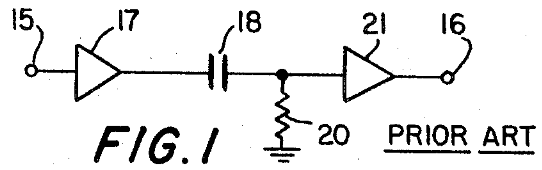
FIG. 1 depicts a typical ECG amplifier and will be helpful in understanding the basic problems with which the invention is concerned.
Figure 3:
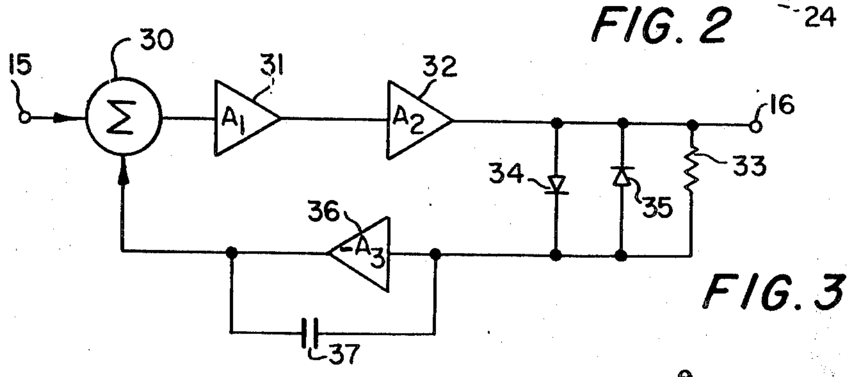
FIG. 3 depicts schematically an illustrative embodiment of my invention.
Figure 4:
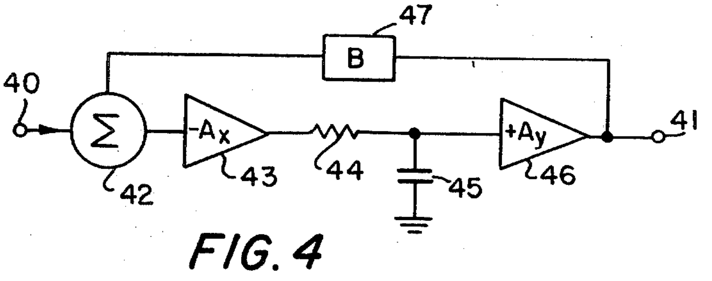
FIG. 4 depicts schematically an illustrative circuit which can be used for amplification stage 32 of FIG. 3.
Figure 6:
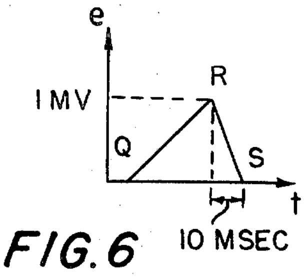
Figure 7:
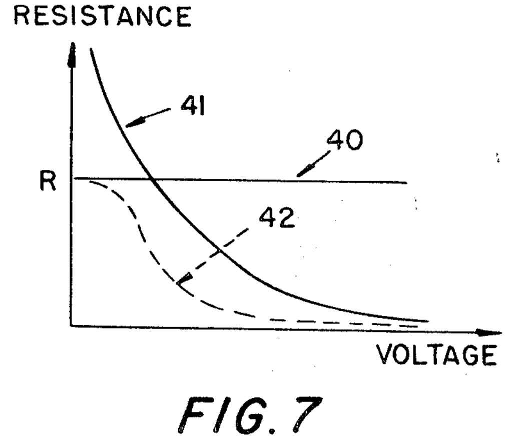
Figure 8:
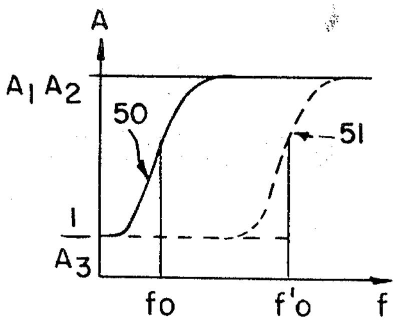

FIG. 6 depicts an idealized QRS waveform which will be helpful in understanding the design requirements of the circuit depicted in FIG. 4. FIG. 7 depicts resistance-voltage characteristics of the elements 33, 34 and 35 of FIG. 3; and FIG. 8 depicts two frequency response curves for the circuit of FIG. 3. FIG. 1 depicts, primarily in block diagram form, a typical prior art ECG amplifier. Input terminal 15 is coupled to an electrode attached to the patient. Output terminal 16 can be coupled to a display unit. The amplifier includes two amplification stages 17, 21. Each of these stages is generally a DC amplifier because the ECG signal contains low frequencies (down as far as 0.05 Hz.) which are of interest. AC coupling is provided between the two stages rather than DC coupling. The purpose of the AC coupling is to remove any DC components due to offsets in the input signal.

The ECG signal as detected at the electrode may have waveforms with magnitudes in the order of a fraction of a millivolt. But the DC component of the signal may be very much greater, even by several orders of magnitude. The output of amplifier 17 may have a range of 10 volts in either direction from ground. Typically, the gain of amplifier 17 may be such that the swing of an ECG waveform at its output is in the order of 5 millivolts. The rest of the range is accounted for by the varying DC level. It is not feasible to couple the output of amplifier 17 directly to the input of amplifier 21 because the DC offset continuously changes as a result of patient movement, switching of electrodes, etc. If there is no way to subtract the DC component of the overall signal before it is applied to the input of amplifier 21, it is apparent that the average value of the output signal at terminal 16 will continuously change. If an oscilloscope is used to display the ECG signal, for example, it will be found that the signal moves up and down on the scope and often moves out of range. While this could be corrected by adjusting the DC zero, for continuous monitoring it would be far better to automatically remove the DC component at the output of amplifier 17. Furthermore, if the DC component is not removed before the input to amplifier 21 and if the DC component becomes large enough, amplifier 21 may saturate.

The DC component is removed by capacitor 18 and resistor 20. Any DC component at the output of amplifier 17 causes a current to flow through the capacitor and the resistor, the capacitor charging to the value of the DC level. Consequently, the only signals appearing at the input of amplifier 21 are the ECG waveforms without base line offset. Furthermore, any time the DC level changes, the capacitor merely charges of discharges through resistor 20 so that the average value of the input signal to amplifier 21 is once again zero.

Capacitor 18 has no effect on the high-frequency components of the ECG signal—for relatively high frequencies the capacitor is a short circuit. However, the capacitor can attenuate the very low frequencies. The product of the resistance (R) of resistor 20 and the capacitance (C) of capacitor 18 is the time constant of the circuit and determines the frequency at the low end of the overall characteristic at which the gain falls 3 db. from the maximum value. (Typically, there is also another RC circuit, in which the positions of the resistor and capacitor are reversed, for limiting the gain at the high-frequency end of the characteristic). If the low-frequency cutoff is 0.05 Hz., a typical value, the product RC must be in the order of 3.5 seconds. (The time constant is equal to the reciprocal of the cutoff frequency multiplied by $\frac{1}{2}\pi$.)

While the inclusion of capacitor 18 in the system removes DC components from the input to amplifier 21, the capacitor has another effect, this one deleterious. There are many situations in which it is necessary to amplify a small ECG signal in the presence of large pulses. For example, it is often found that large pulses or spikes appear in the overall ECG signal of a patient equipped with an implanted pacemaker; the pacemaker-stimulating pulses appear in the ECG signal prior to each QRS waveform.

Typically, these spikes have an amplitude much greater than the amplitude of an ECG waveform. It is apparent that if the gains of amplifier 17 and 21 are adjusted to provide a near full-scale display for the ECG signal, each spike will result in an off scale output. This, in itself, is of little concern. The problem of most concern is that each spike may affect the amplifier in a way such that the ECG signal following the spike for several seconds may also be off scale.

Figure 2:
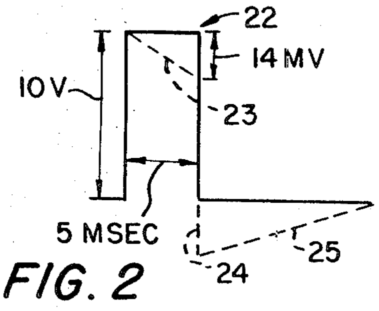
FIG. 2 depicts two voltage waveforms which characterize the operation of the circuit of FIG. 1.

The effect of a large pulse at terminal 15 can be understood with reference to the waveforms of FIG. 2. For illustrative purposes, let it be assumed that the ECG waveform amplitude at the output of amplifier 17 is 5 millivolts, and the gain of amplifier 21 is such that a 5-millivolt input results in a full-scale display. It is well known that the voltage spike (22 in FIG. 2) which appears at terminal 15 in a typical ECG amplifier may have an amplitude which is greater than the otherwise maximum amplitude of the ECG signal by several orders of magnitude. In such a case, the spike at the output of amplifier 17 may have an amplitude of 10 volts since this is the maximum swing of the voltage at the output of amplifier 17. Typically, the spike might have a duration of 5 milliseconds as shown in the drawing. This is so short a time interval compared to the time constant of the AC coupling circuit that the charging of capacitor 18 can be approximated by a straight line. The voltage across a capacitor cannot change instantaneously and thus the voltage at the junction of capacitor 18 and resistor 20 jumps to 10 volts as soon as the spike is applied. Using the linear approximation for short time intervals, the capacitor then charges according to the equation $V_c=ET/RC$, where $V_c$ is the voltage across the capacitor, $E$ is the voltage at the output of amplifier 17 (10 volts), and $RC$ is the time constant of the circuit. At the end of the spike, after 5 milliseconds have elapsed, the voltage across the capacitor, $V_c$, equals $10(5\times10^{13})/3.5$ or a little over 14 millivolts. Thus, as shown by the dotted line 23 in FIG. 2, at the end of the spike the voltage at the input to amplifier 21 is +10 volts, less 14 millivolts. At the trailing edge of the spike the voltage across capacitor 18 immediately drops by 10 volts, and the input to amplifier 21 is −14 millivolts as shown by dotted line 24. It is apparent that if the gain of amplifier 21 is such that a 5-millivolt ECG waveform produces a full-scale display, than the 14-millivolt negative signal produces an off scale output signal. The output signal remains off scale until capacitor 18 discharges through resistor 20. But with a time constant of 3.5 seconds, it is apparent that the output signal remains off scale (as shown by dotted line 25) for a considerable time period. Several seconds must elapse before capacitor 18 discharges. During this time the output is off scale and the monitoring information is lost.

If the amplifier has a gain such that an ECG waveform produces a near full-scale output for the particular display, it is apparent that if capacitor 18 charges during a spike by an amount greater than the normal ECG amplitude at the output of amplifier 17 than the display will be off scale for several seconds. The problem is aggravated in some cases where a large sudden change in the output of amplifier 17 (input of amplifier 21) may exceed the rated input for amplifier 21. In such a case, the input transistors in amplifier 21 may saturate or break down and operate as diodes; the ordinary high input impedance of amplifier 21 is reduced significantly, a large current flows, and capacitor 18 charges to an even greater extent.

The problem is present even if the spikes do not drive the output of amplifier 17 to its maximum value of 10 volts. Suppose that a patient equipped with a pacemaker is being monitored and each pacemaker pulse drives the output of amplifier 17 to 1 volt, as compared to 5 millivolts for each ECG waveform (QRS pulse). At the end of a 5-millisecond spike of this type, capacitor 18 is charged to 1.4 millivolts (compared to 14 millivolts for a 10-volt spike). The next ECG waveform of 5 millivolts is displayed. However, during the next approximately 1 second between pacemaker pulses, capacitor 18 discharges only about 25 percent, or to a voltage of approximately 1 millivolt. The next pacemaker pulse adds 1.4 volts to the capacitor voltage, for a total of 2.4 millivolts. The capacitor discharges by 25 percent, and another 1.4 millivolt increment is then applied. The voltage across capacitor 18 builds up as soon as the pacemaker starts to function, and soon results in an off scale display. Eventually, capacitor 18 readjusts the DC level so that the display is not off scale. However, every time the pacemaker turns on the display disappears for a few seconds. A similar loss of display occurs whenever the pacemaker turns off.

Various solutions to this problem have been suggested in the prior art. One of these is disclosed in the copending application of Barouh V. Berkovits, Ser. No. 793,261 filed on Jan. 23, 1969, and another is disclosed in my copending application Ser. No. 849,624 filed on Aug. 13, 1969, which has since matured into Pat. No. 3,534,283. In these schemes, a capacitor such as capacitor 18 of FIG. 1 is included for the purpose of removing DC components due to the offsets in the input signal. Because the capacitor gives rise to the spike problem described above, each scheme provides a circuit for minimizing the effects of spikes.

In accordance with the present invention, the capacitor is not included in the forward path of the amplifier. (Although a capacitor is included in a feedback path and does give rise to a similar spike problem, the problem is not nearly as severe as will be described below, and can be reduced further quite simply). Instead of using a capacitor, an alternative scheme is used to remove DC components due to offsets in the input signal.

In the illustrative embodiment of the invention depicted in FIG. 3, the input ECG signal at terminal 15 is applied to one input of summer 30. Amplifier 31 and 32, with respective gains of $A_1$ and $A_2$, couple the output of the summer to output terminal 16. Neglecting diodes 34 and 35 for the moment, resistor 33, amplifier 36 and capacitor 37 are a conventional integrating circuit. The output of the amplifier is a DC voltage which is proportional to the average output level at terminal 16. However, the output of amplifier 36 is of opposite phase because of the negative gain ($-A_3$) of the amplifier. The negative signal (in the case of an input signal with a positive DC offset) is added to the input signal to reduce the DC level of the signal applied to the input of amplifier 31. In this way DC components in the input signal are nulled in the summer before application to the input of amplifier 31.

Curve 50 of FIG. 8 depicts the overall gain from terminal 15 to terminal 16 as a function of frequency. For signals of very low (including DC), capacitor 37 is effectively an open circuit. Consequently, the feedback path from terminal 16 to summer 30 appears as an amplifier of gain $-A_3$. In general, it is well known that if the forward path gain of am amplifier is A and the feedback factor is B, then the overall gain of the closed loop is $A/(1-AB)$. In the case of the circuit of FIG. 3, the 2. path gain (A) is $A_1$ $A_2$. Thus for signals of very low frequencies, the overall gain of the amplifier is $A_1A_2/(1-(A_1A_2)(-A_3))$. Typically, the product $A_1A_2$ is much greater than unity, and the gain $A_3$ in accordance with the principles of the invention is similarly made much greater than unity. Consequently, the overall gain of the amplifier is approximated by $1/A_3$. This is shown in FIG. 8—at very low frequencies the overall gain of the amplifier is $1/A_3$. (If the maximum input offset is known along with the maximum allowable output offset, $A_3$ should be selected to be greater than the ratio of the maximum allowable output offset to the maximum input offset; this will insure that in the case of the maximum input offset; this will insure that in the case of the maximum input offset the output will be less than the maximum allowable.)

For signals of high enough frequencies, capacitor 37 in FIG. 3 appears as a short circuit. Amplifier 36 is an operational amplifier whose input appears as a virtual ground. Consequently, the feedback input to summer 30 is effectively grounded and there is no feedback. The gain of the overall amplifier is simply that of the forward path, namely, $A_1A_2$, as shown in FIG. 8.

For signals of frequencies between the two extremes, the gain of the overall amplifier increases from the minimum value of $1/A3$ to the maximum value of $A_1A_2$. As is known to those skilled in the art, the gain of an amplifier with reactive feedback drops 3 db. from the maximum value when the inverse of the feedback factor equals the forward gain. In the case of FIG. 3, the lower 3 db. frequency $F_0$ is determined from the equation $A_1A_2=2\pi f_0CR$, where $C$ is the capacitance of capacitor 37 and R is the resistance of resistors 33 (still neglecting diodes 34 and 35). Thus, the low frequency 3 db. point (typically 0.05 Hz.) is $A_1A2/2'\pi CR$.

It is also known to those skilled in the art, however, that the greater the time constant of a reactive circuit in the feedback loop of an amplifier, the longer the time required for the output voltage to stabilize following an abrupt change in input level. If the input voltage at terminal 15 of FIG. 3 suddenly changes, for example, due to movement of the patient or polarization of the electrodes attached to him, the DC input offset might change at a rate faster than that which the amplifier is capable of handling. In such a case the DC output level at terminal 16 might rise appreciably and a considerable time might elapse before the feedback circuit causes the output to drop back to a value equal to the new input DC offset multiplied by the factor $1A_3$.

In accordance with the principles of my invention, base line stabilization is achieved by changing the time constant of the integrating circuit in the feedback path. The time constant of the integrating circuit (RC) is ordinarily relatively high in order that $f_0$=0.05 Hz. Without a large time constant, the low frequencies of interest in the ECG signal would not appear at output terminal 16 since they would be treated just as low-frequency in the base line at the input and nulled out. But when the output voltage has gone too high in either direction, for example, in response to a step input, it is more important to get the output back to a usable level than it is to amplify low-frequency components in the ECG signal. For this reason, when the output goes too high in either direction, the time constant of the feedback circuit is reduced. This, in turn, raises low-frequency cutoff from $f_0$ to $f'_0$, as shown by dotted curve 51 in FIG. 8. As the output level returns to a lower value, the time constant is increased once again.

The time constant is reduced by the provision of diodes 34 and 35 connected in parallel across resistor 33. The resistance of each diode is so high when reverse biased that it can be neglected. When forward biased, the resistance of the diode decreases as the voltage increases. The resistance-voltage characteristic is logarithmic as shown by curve 41 in FIG. 7. This curve represents the resistance of either one of the diodes when it is forward biased. Curve 40 represents the resistance of resistor 33—it is a constant value $R$ no matter what the voltage across the resistor.

All three elements are connected between terminal 16 and the input to amplifier 36, which input is a virtual ground. Consequently, the full output signal appears across the three elements connected in parallel. As the output signal swings in either direction, the resistance of the forward-biased diode decreases and the total resistance in the feedback network is the parallel combination of one of the diodes and resistor 33. The effective resistance of two paralleled elements having resistance-voltage curves 40 and 41 of FIG. 7 is that shown by dotted curve 42. At low voltages, the total resistance is approximately $R$. As the voltage increases, the resistance drops only slightly at first. But as the voltage continues to rise the drop in resistance becomes significant. With an ordinary diode, the resistance approaches a very low value at a forward bias of approximately 0.5 volt. Thus by the time the output voltage at terminal 16 exceeds 0.5 volt in either direction, the time constant of the integrating circuit has been reduced drastically in order to allow the system to stabilize quickly.

Spikes at the input of the amplifier of FIG. 3 are amplified and appear at output terminal 16. Since the input to the integrating circuit is connected to the output terminal, capacitor 37 can be charged by such spikes. As described above, the charging of a capacitor by a spike can cause the output to go off scale. This is true of a capacitor both in the forward path and in the feedback path of an amplifier. In the case of capacitor 37, a spike could cause a large DC voltage to be applied to the feedback input of summer 30 until after the capacitor has discharged following the termination of the spike. In accordance with the principles of my invention, instead of allowing the capacitor to charge and then providing a mechanism for rapidly discharging it, the capacitor is prevented from charging from a spike in the first place. This is accomplished by preventing spikes from appearing at terminal 16.

Figure 5:
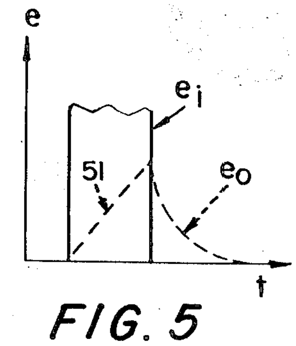
FIG. 5 depicts two waveforms which will be helpful in understanding the operation of the circuit of FIG. 4.

Amplifier 32 of FIG. 3 is slew-rate limited. A slew-rate limited amplifier is one which does not allow a rate of rise in the output voltage faster than a predetermined rate. For changes in the input occurring slower then the slew rate, the output follows the input. Referring to FIG. 5, an input spike $e_i$ is assumed to be applied to the input of amplifier 32. The slew rate of the amplifier is shown by line segment 51 of the output voltage curve $e_0$ (shown dotted). The output of amplifier 32 cannot rise at a rate faster than the rate represented by the slope of line 51. Consequently, although the input rises rapidly, the output rises linearly. At the termination of the spike, the output decays exponentially. It is apparent that with the use of a slew-rate limited amplifier for amplifier 32, excessive spikes cannot appear at terminal 16 to be applied to capacitor 37.

It is necessary to choose the proper slew rate for the amplifier. FIG. 6 shows a typical QRS waveform in an ECG signal. The peak signal of 1 millivolt at input terminal 15 corresponds to the R wave. The fastest rate of change in the input is the fall between R and S, which typically occurs in 10 milliseconds. Assuming a gain $A_1A_2$of 1,000, the output voltage rises to 1 volt with the application of the R wave, and then falls 1 volt in 10 milliseconds. Thus the maximum rate of change of output voltage (a fall) is 1 volt in 10 milliseconds or 100 volts/second. To insure that the output can follow the input, the slew rate can be chosen to be 200 volts/second.

A typical pacemaker pulse is 5 milliseconds in width. This pulse is treated as a spike since its rate of rise is faster than the slew rate of amplifier 32. Instead of the output of the amplifier following the spike, the output potential grows at the rate of 200 volts per second. At the end of the 5-millisecond pulse, the output is at 1 volt. The output decays exponentially at the termination of the spike. The 1-volt peak reached during the application of the spike is the same as that for the R wave. Consequently, the signal at terminal 16 faithfully follows the ECG signal; superimposed on the ECG signal are the pacemaker spikes which typically occur before the Q waves. The spikes are no larger than the peaks of the ECG signal, and have no deleterious effect on the circuit operation.

A slew-rate limited amplifier which can be used for amplifier 32 is shown in FIG. 4. At low frequencies, where slew-rate limiting does not occur, resistor 44 and capacitor 45 need not be considered since the capacitor presents a very high impedance across the input of amplifier 46. Amplifier 43 has a gain of $-A_x$ and amplifier 46 has a gain of $+A_y$. The feedback factor of feedback network 47 is $\beta$. The output signal at terminal 41 is added to the input signal at terminal 40 by summer 42. Using the basic equation for the overall gain of an amplifier provided with feedback, the low-frequency gain of the amplifier of FIG. 4 is $(-A_x)\ (+A_y)/(1-(-/A_x)(+A_y)(\beta))$. If the magnitude of $(A_x)(A_y)(\beta)$ is much greater than unity, the overall gain at low frequencies is $1/\beta$. If the amplifier of FIG. 4 is used for amplifier 32 of FIG. 3, $(1/\beta)=A_2$.

On the other hand, consider the situation for very high frequencies, represented for example by a step input at terminal 40. The voltage across a capacitor cannot change instantaneously, and consequently the voltage across capacitor 45 does not change at the moment when the step input appears at terminal 40. Effectively, there is no feedback since the input to amplifier 46 does not instantly change. The output of amplifier 43 (being high gain) saturates with the application of the step at its input. Capacitor 45 then charges through resistor 44 from the constant (saturated) output of amplifier 43. Assuming that amplifier 46 has a high gain and an output saturation voltage of the same order of magnitude as that of amplifier 43, the input voltage to amplifier 46 does not rise appreciably. Consequently, although the voltage across capacitor 45 rises after the step input is applied, the voltage rise can be approximated by a straight line since the final voltage across the capacitor is well below the saturated output voltage of amplifier 43. Since the input to amplifier 46 rises linearly, so does the output of the amplifier at terminal 41. The rate of rise of the output following the application of the step input defines the slew rate of the overall amplifier. This slew rate cannot be exceeded, and if the amplifier of FIG. 4 is used for amplifier 32 of FIG. 3, capacitor 37 cannot be significantly charged as a result of a spike appearing at input terminal 15.

Although the invention has been described with reference to a particular embodiment, it is to be understood that this embodiment is merely illustrative of the application of the principles of the invention. For example, instead of using diodes 34 and 35, threshold detectors could be incorporated in the system to switch in a lower resistance if the output voltage exceeds a threshold level. Thus it is to be understood that numerous modifications may be made in the illustrative embodiment and other arrangements may be devised without departing from the spirit and scope of the invention.

What is claimed is:

1. An amplifier for use in electrocardiographic monitoring connected between input and output terminals comprising DC-coupled amplifying means connected in the forward path from said input terminal to said output terminal, and a negative gain feedback network coupled from said output terminal to the input of said amplifying means, said feedback network including an integrating circuit having continuous nonlinear resistance means.

2. An amplifier in accordance with claim 1 wherein said nonlinear resistance means includes a parallel connection of a resistor and diode means.

3. An amplifier in accordance with claim 2 further including means for slew-rate limiting said forward path amplifying means.

4. An amplifier in accordance with claim 3 wherein the slew rate of said forward path amplifying means is fast enough to permit an ECG waveform to be transmitted from said input terminal to said output terminal without slew-rate limiting but is slow enough to slew-rate limit spikes anticipated at said input terminal.

5. An amplifier in accordance with claim 1 wherein said nonlinear resistance means reduces the time constant of said integrating circuit as the magnitude of the signal at said output terminal increases.

6. An amplifier in accordance with claim 5 further including means for slew-rate limiting said forward path amplifying means.

7. An amplifier in accordance with claim 6 wherein the slew rate of said forward path amplifying means is fast enough to permit an ECG waveform to be transmitted from said input terminal to said output terminal without slew-rate limiting but is slow enough to slew-rate limit spikes anticipated at said input terminal.

8. An amplifier comprising input and output terminals, means for DC-coupling a signal appearing at said input terminal to said output terminal and for amplifying said signal before application thereof to said output terminal, means for slew-rate limiting the amplification of said signal before the application thereof to said output terminal, and feedback means for subtracting from said input signal a signal which is proportional to the average signal at said output terminal said feedback means being characterized by an effective time constant for low frequency signals, and further including means for reducing the time constant of said feedback means as the magnitude of the signal at said output terminal increases.

9. An amplifier in accordance with claim 8 wherein said time-constant-reducing means includes a parallel connection of a resistor and diode means.

10. An amplifier in accordance with claim 8 wherein the slew rate of the signal at said output terminal is fast enough to permit an ECG waveform to be transmitted from said input terminal to said output terminal without slew-rate limiting but is slow enough to slew-rate limit spikes anticipated at said input terminal.

11. An electrocardiographic monitoring amplifier having input and output terminals, said amplifier comprising forward DC-coupled amplifying means for amplifying a signal applied to said input terminal and for providing an output signal on said output terminal, negative feedback means connected from said output terminal to said input terminal said feedback means including integrating amplification means for controlling gain of said amplifier, said feedback means further including time-constant-varying means responsive to changes in amplitude of said output signal for continuously varying a time constant of said integrating amplification means.